Nov. 3, 1936.       J. A. DORST       2,059,213
TRACK TENSIONING DEVICE
Filed Jan. 11, 1936
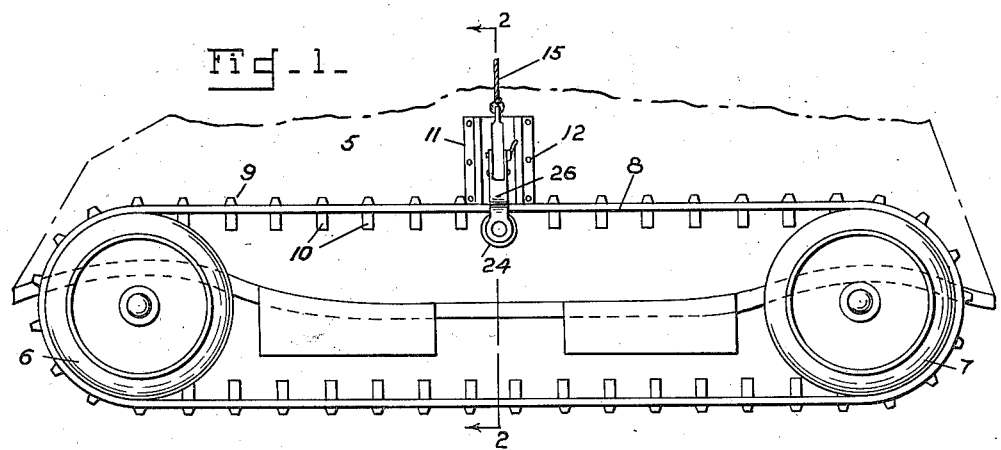
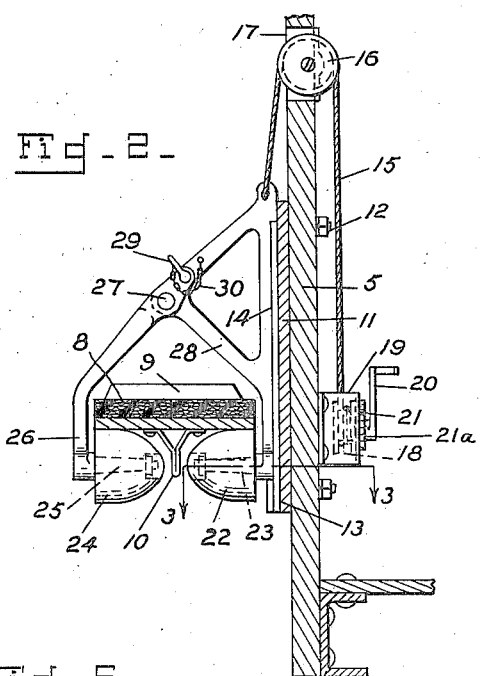
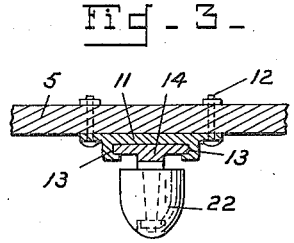
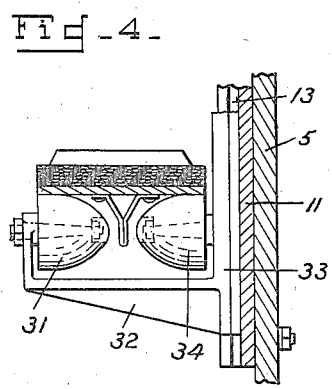
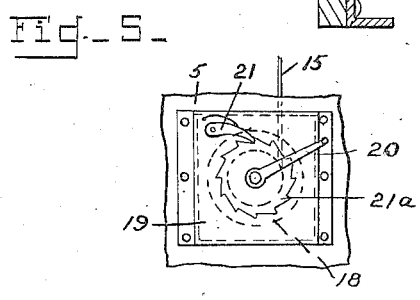
Inventor
James A. Dorst
By W. N. Roach
Attorney Patented Nov. 3, 1936

2,059,213

UNITED STATES PATENT OFFICE 2,059,213

TRACK TENSIONING DEVICE

James A. Dorst, United States Army, San Francisco, Calif.

Application January 11, 1936, Serial No. 58,711

2 Claims. (Cl. 305—8)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track tensioning device for a track-laying vehicle.

The usual provision for maintaining a band track under a predetermined tension is made by resiliently mounting a track idler wheel for longitudinal movement. Such an arrangement unduly complicates the structure especially where the track idler is associated with the vehicle suspension.

The purpose of this invention is to provide a track tensioning device which is conveniently mounted on the side of the vehicle body and is controlled from a position within the vehicle body.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation of a portion of a track-laying vehicle equipped with a tensioning device constructed in accordance with the invention.

Fig. 2 is a sectional view on the line 2—2 of Fig. 1.

Fig. 3 is a sectional view on the line 3—3 of Fig. 2.

Fig. 4 is a view similar to Fig. 2 but showing a modified arrangement for carrying the rollers.

Fig. 5 is a detail view in side elevation of a portion of the actuating mechanism showing the pawl and ratchet.

Referring to the drawing by characters of reference, there is shown a vehicle comprising a body 5, wheels 6 and 7 and a flexible endless band track 8 trained about the wheels on each side of the body. The track includes the usual cleats 9 and wheel guides 10.

A plate 11 secured to the body 5 by means of bolts 12 is formed with opposite vertically arranged grooves 13—13 for receiving a slide 14. The slide is moved to and held in vertically adjusted position by means of a cable 15 having one end fastened to its upper end and trained over a pulley 16 which is mounted on the body and partially disposed in an opening 17 therein. The inner end of the cable is connected to a pulley 18 which is mounted in a casing 19 secured to the inner side of the body 5. A handle 20 is provided for rotating the pulley to raise the slide 14 and control its lowering and is associated with a conventional pawl 21 and ratchet wheel 21a.

A roller 22 is mounted on a stud 23 on the lower end of the slide 14. A second roller 24, disposed oppositely to the roller 22, is mounted on a stud 25 on the outer end of an arm 26 which is pivotally mounted through a pin 27 on a truss 28 fixed to the slide. The arm 26 may be fixed to the truss by means of a pin 29 which is carried by a chain 30, and this is its normal arrangement to maintain the roller 24 in track supporting position. The arm is swung about its pivot when the track is to be removed. The rollers 22 and 24 are preferably conoidal and are arranged with their adjacent apical ends spaced to permit passage of the wheel guides 10.

The track is supported on the rollers and is maintained under proper tension by the vertical position of adjustment of the slide 14 carrying the rollers.

In the modification shown in Fig. 4 the outside roller 31 is carried by a fixed arm 32 projecting from the slide 33 below the inside roller 34.

I claim:

1. In a vehicle, a body, a plate fixed on the outer side of the body, a slide guided in the plate for vertical movement, means operable from within the body for displacing the slide, and a pair of conoidal track-supporting rollers carried by the slide and having their apical ends spaced.

2. In a vehicle, a body, a slide mounted for vertical movement on the outer side of the body, means operable from within the body for displacing the slide, a roller carried by the slide, an arm pivoted to the slide, means for fixing the arm to the slide and a roller carried by the pivoted arm and positioned opposite the first mentioned roller when the arm is fixed to the slide.

JAMES A. DORST.